US012793429B2

(12) United States Patent
Chen et al.

(10) Patent No.: US 12,793,429 B2
(45) Date of Patent: Nov. 10, 2026

(54) SYSTEMS AND METHODS FOR DETERMINING TARGET EVENT

(71) Applicant: ZHEJIANG DAHUA TECHNOLOGY CO., LTD., Hangzhou (CN)

(72) Inventors: Qing Chen, Hangzhou (CN); Feng Xiao, Hangzhou (CN); Hequn Zhang, Hangzhou (CN); Xiangming Zhou, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 251 days.

(21) Appl. No.: 18/590,979

(22) Filed: Feb. 29, 2024

(65) Prior Publication Data

US 2024/0203128 A1 Jun. 20, 2024

Related U.S. Application Data

(63) Continuation of application No. PCT/CN2021/135332, filed on Dec. 3, 2021.

(30) Foreign Application Priority Data

Aug. 31, 2021 (CN) ......................... 202111013256.2

(51) Int. Cl.
*G06V 20/54* (2022.01)
*G06T 7/00* (2017.01)
(Continued)

(52) U.S. Cl.
CPC ............ *G06V 20/54* (2022.01); *G06T 7/0002* (2013.01); *G06T 7/70* (2017.01); *G06V 10/22* (2022.01);
(Continued)

(58) Field of Classification Search
None
See application file for complete search history.

(56) References Cited

U.S. PATENT DOCUMENTS 10,949,814 B1 * 3/2021 Nelson .................. G06Q 10/20
2016/0358634 A1 12/2016 Molgaard et al.

FOREIGN PATENT DOCUMENTS

CN 106297278 A 1/2017
CN 107396043 A 11/2017
(Continued)

OTHER PUBLICATIONS

International Search Report in PCT/CN2021/135332 mailed on May 31, 2022, 4 pages.
(Continued)

*Primary Examiner* — Mark R Milia
(74) *Attorney, Agent, or Firm* — METIS IP LLC

(57) ABSTRACT

A method for determining a target event may be provided. The method may include obtaining a first image including a first subject and information related to the first subject. The method may include determining a second image including the first subject based on the first image and the information related to the first subject. The second image may be captured no later than the first image. The method may also include determining a third image including a second subject based on the second image. The first subject may be associated with the second subject. The method may also include determining a background image which does not include the first subject. The method may further include determining a target event based on the background image, the second image, and the third image.

18 Claims, 7 Drawing Sheets

100

(51) Int. Cl.
*G06T 7/70* (2017.01)
*G06V 10/22* (2022.01)
*G06V 10/98* (2022.01)

(52) U.S. Cl.
CPC .. *G06V 10/993* (2022.01); *G06T 2207/10016* (2013.01); *G06T 2207/30236* (2013.01); *G06V 2201/07* (2022.01)

(56) References Cited

FOREIGN PATENT DOCUMENTS

| | | | |
|---|---|---|---|
| CN | 110889371 | A | 3/2020 |
| CN | 111127507 | A | 5/2020 |
| CN | 111797727 | A | 10/2020 |
| CN | 111814668 | A | 10/2020 |
| CN | 113076934 | A | 7/2021 |
| CN | 113255580 | A | 8/2021 |

OTHER PUBLICATIONS

Written Opinion in PCT/CN2021/135332 mailed on May 31, 2022, 4 pags.

Zhao, Tiantian, A Real-time Moving Isolate Detection Based on Dynamic Backgroud, Chinese Excellent Master's Thesis Full Text Database Information Technology Collection, 2016, 83 pages.

Kevein Lin et al., Abandoned Object Detection via Temporal Consistency Modeling and Back-Tracing Verification for Visual Surveillance, IEEE Transations on Information Forensics and Security, 10(7): 1359-1370, 2015.

* cited by examiner

SYSTEMS AND METHODS FOR DETERMINING TARGET EVENT

CROSS-REFERENCE TO RELATED APPLICATIONS

This application is a continuation of International Application No. PCT/CN2021/135332, filed on Dec. 3, 2021, which claims priority to Chinese Application No. 202111013256.2 filed on Aug. 31, 2021, the entire contents of which are hereby incorporated by reference.

TECHNICAL FIELD

The present disclosure relates to monitoring technology, and in particular, to systems and methods for determining a target event based on images captured by a monitoring technology.

BACKGROUND

A construction vehicle running on a road, such as a muck truck, a mixer truck, may leak or sprinkle pollutants such as muck or mud, which not only pollute the road, but also increase road safety risks. Therefore, it is necessary to detect road pollution events caused by construction vehicles. Conventionally, a road pollution event is determined by a user manually by checking a surveillance video, which has a low efficiency. With the development of the field of computer based image and video analysis, an automatic detection of a road pollution event has realized using a computer vision technology. However, in some occasions, some subjects such as a shadow, a water mark, etc. may be identified as pollutants, thereby reducing the accuracy of the detection of the road pollution event. It is desirable to provide systems and methods for accurately detecting a road pollution event.

SUMMARY

According to an aspect of the present disclosure, a system for determining a target event may be provided. The system may include at least one storage device and at least one processor configured to communicate with the at least one storage device. The at least one storage device may include a set of instructions. When the at least one processor execute the executable instructions, the at least one processor may be directed to cause the system to perform one or more of the following operations. The system may obtain a first image including a first subject and information related to the first subject. The system may determine a second image including the first subject based on the first image and the information related to the first subject. The second image may be captured no later than the first image. The system may also determine a third image including a second subject based on the second image. The first subject may be associated with the second subject. The system may also determine a background image which does not include the first subject. The system may further determine a target event based on the background image, the second image, and the third image.

In some embodiments, the information related to the first subject may include at least a type of the first subject and a position of the first subject in the first image.

In some embodiments, the at least one processor may be further directed to cause the system to perform one or more of the following operations. The system may determine a fourth image based on the second image. The fourth image may be captured later than the second image. The system may determine whether the fourth image includes the first subject based on the information related to the first subject. In response to determining that the fourth image includes the first subject, the system may further determine the target event based on the background image, the second image, the third image, and the fourth image.

In some embodiments, to determine whether the fourth image includes the first subject based on the information related to the first subject, the system may obtain a target region of the fourth image corresponding to the position of the first subject. The system may further determine whether the fourth image includes the first subject in the target region.

In some embodiments, in response to determining that the fourth image does not include the first subject, the system may determine that the target event does not occur.

In some embodiments, to determine a second image including the first subject based on the first image and the information related to the first subject, the system may obtain a plurality of first historical images which are captured earlier than the first image. The system may also determine whether one or more first candidate images of the plurality of first historical images include the first subject. In response to determining that one or more first candidate images include the first subject, the system may further determine a first candidate image as the second image from the one or more first candidate images.

In some embodiments, in response to determining that no first candidate image includes the first subject, the system may designate the first image as the second image.

In some embodiments, to determine a third image including a second subject based on the second image, the system may obtain a plurality of second historical images which are captured earlier than the second image. The system may also determine one or more second candidate images each of which includes the second subject based on the plurality of second historical images. The system may further determine a second candidate image captured at the latest as the third image from the one or more second candidate images.

In some embodiments, to determine a background image, the system may obtain a plurality of third historical images which are captured earlier than the third image. The system may also determine one or more third candidate images each of which does not include the first subject based on the plurality of third historical images and the information related to the first subject. The system may further determine a third candidate image captured at the latest as the background image from the one or more third candidate images.

In some embodiments, to obtain a first image including a first subject and information related to the first subject, the system may determine the first image including the first subject and the information related to the first subject using a subject detection model.

In some embodiments, to obtain a first image including a first subject and information related to the first subject, the system may obtain an initial image including the first subject. The system may also determine whether a clarity of the initial image exceeds a threshold. In response to determine that the clarity of the initial image exceeds the threshold, the system may further designate the initial image as the first image.

In some embodiments, the at least one processor may be further directed to cause the system to perform one or more of the following operations. The system may obtain identity information of the second subject based on the third image. The system may determine the target event based on the background image, the second image, the third image, and the identity information of the second subject.

According to an aspect of the present disclosure, a system for determining a target subject may be provided. The system may include at least one storage device and at least one processor configured to communicate with the at least one storage device. The at least one storage device may include a set of instructions. When the at least one processor execute the executable instructions, the at least one processor may be directed to cause the system to perform one or more of the following operations. The system may obtain a first image including a first subject and information related to the first subject. The system may determine a second image including the first subject based on the first image and the information related to the first subject. The second image may be captured no later than the first image. The system may also determine a third image based on the second image. The third image may be captured later than the second image. The system may also determine whether the third image includes the first subject based on the information related to the first subject. In response to determining that the third image includes the first subject, the system may further determine that the first subject is a target subject.

In some embodiments, the at least one processor may be further directed to cause the system to perform one or more of the following operations. The system may determine a background image which does not include the first subject. The system may also determine a fourth image including a second subject based on the second image. The first subject may be associated with the second subject. The system may further determine a target event based on the background image, the second image, the third image, and the fourth image.

According to another aspect of the present disclosure, a method for determining a target event may be provided. The method may include obtaining a first image including a first subject and information related to the first subject. The method may include determining a second image including the first subject based on the first image and the information related to the first subject. The second image may be captured no later than the first image. The method may also include determining a third image including a second subject based on the second image. The first subject may be associated with the second subject. The method may also include determining a background image which does not include the first subject. The method may further include determining a target event based on the background image, the second image, and the third image.

According to yet another aspect of the present disclosure, a method for determining a target subject may be provided. The method may include obtaining a first image including a first subject and information related to the first subject. The method may also include determining a second image including the first subject based on the first image and the information related to the first subject. The second image may be captured no later than the first image. The method may also include determining a third image based on the second image. The third image may be captured later than the second image. The method may also include determining whether the third image includes the first subject based on the information related to the first subject. In response to determining that the third image includes the first subject, the method may further include determining that the first subject is a target subject.

According to yet another aspect of the present disclosure, a system for determining a target event may be provided. The system may include an acquisition module, a first determination module, a second determination module, a third determination module, and a fourth determination module. The acquisition module may be configured to obtain a first image including a first subject and information related to the first subject. The first determination module may be configured to determine a second image including the first subject based on the first image and the information related to the first subject. The second image may be captured no later than the first image. The second determination module may be configured to determine a third image including a second subject based on the second image. The first subject may be associated with the second subject. The third determination module may be configured to determine a background image which does not include the first subject. The fourth determination module may be configured to determine a target event based on the background image, the second image, and the third image.

According to yet another aspect of the present disclosure, a system for determining a target subject may be provided. The system may include an acquisition module, a first determination module, a second determination module, and a third determination module. The acquisition module may be configured to obtain a first image including a first subject and information related to the first subject. The first determination module may be configured to determine a second image including the first subject based on the first image and the information related to the first subject. The second image may be captured no later than the first image. The second determination module may be configured to determine a third image based on the second image. The third image may be captured later than the second image. The third determination module may be configured to determine whether the third image includes the first subject based on the information related to the first subject. In response to determining that the third image includes the first subject, the third determination module may be configured to determine that the first subject is a target subject.

According to yet another aspect of the present disclosure, a non-transitory computer readable medium may be provided. The non-transitory computer readable may include at least one set of instructions for determining a target event. When executed by at least one processor of a computing device, the at least one set of instructions may cause the computing device to perform a method. The method may include obtaining a first image including a first subject and information related to the first subject. The method may include determining a second image including the first subject based on the first image and the information related to the first subject. The second image may be captured no later than the first image. The method may also include determining a third image including a second subject based on the second image. The first subject may be associated with the second subject. The method may also include determining a background image which does not include the first subject. The method may further include determining a target event based on the background image, the second image, and the third image.

According to yet another aspect of the present disclosure, a non-transitory computer readable medium may be provided. The non-transitory computer readable may include at least one set of instructions for determining a target subject. When executed by at least one processor of a computing device, the at least one set of instructions may cause the computing device to perform a method. The method may include obtaining a first image including a first subject and information related to the first subject. The method may also include determining a second image including the first subject based on the first image and the information related to the first subject. The second image may be captured no later than the first image. The method may also include determining a third image based on the second image. The third image may be captured later than the second image. The method may also include determining whether the third image includes the first subject based on the information related to the first subject. In response to determining that the third image includes the first subject, the method may further include determining that the first subject is a target subject.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
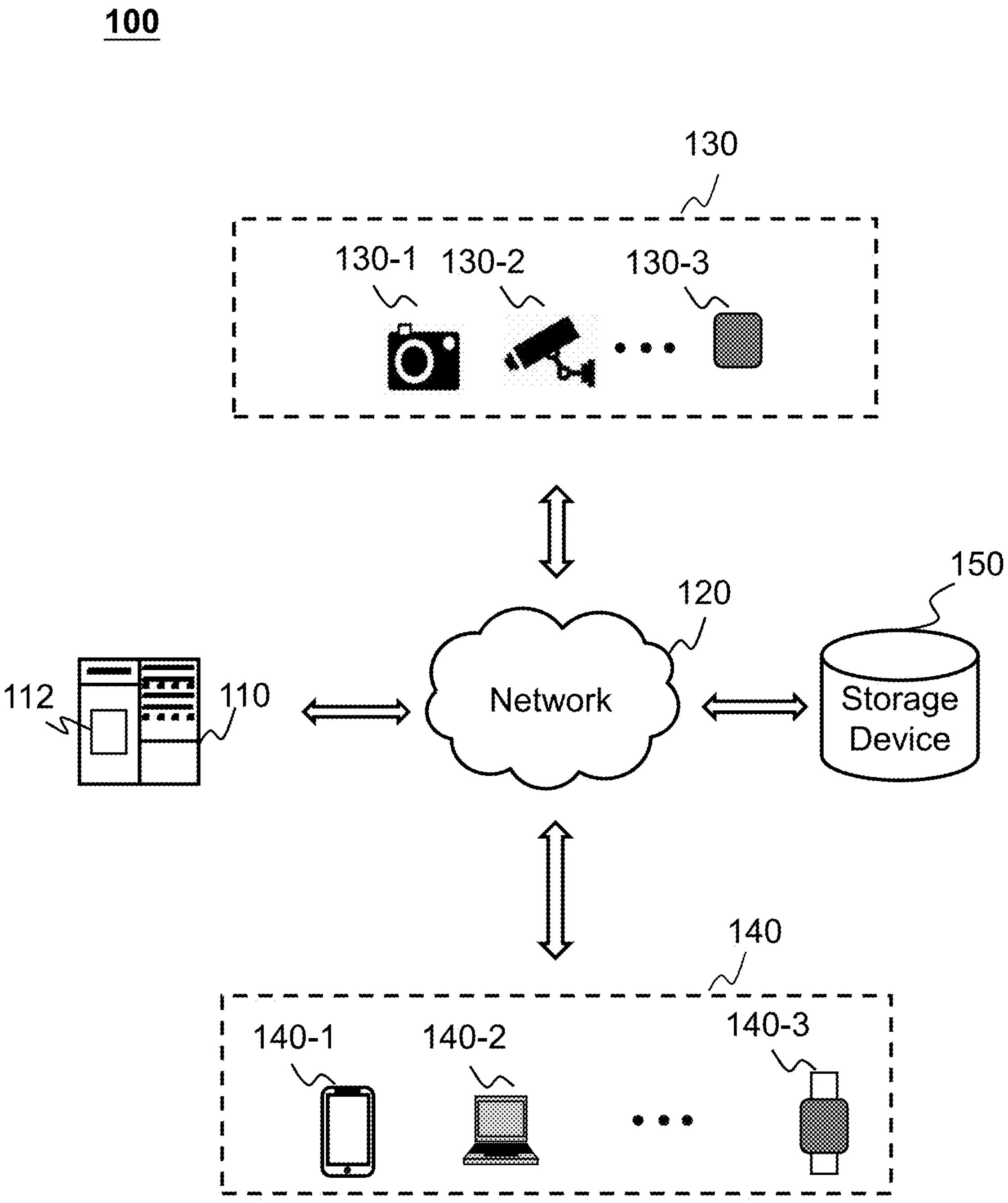
FIG. 1 is a schematic diagram illustrating an exemplary monitoring control system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

An aspect of the present disclosure relates to systems and methods for determining a road pollution event caused by a construction vehicle (e.g., a muck truck). The systems may obtain a first image including a pollutant and information related to the pollutant. The information related to the pollutant may include at least a type of the pollutant and a position of the pollutant in the first image. The systems may determine a second image including the pollutant based on the first image and the information related to the pollutant. The second image may be captured no later than the first image. The systems may also determine a third image including a construction vehicle based on the second image and a background image which does not include the pollutant. The pollutant may be associated with the construction vehicle. For example, the construction vehicle may leak or sprinkle the pollutant while the construction vehicle is running on a road to cause the road pollution event. Further, the systems may determine the road pollution event based on the background image, the second image, and the third image. Conventionally, a user needs to manually check a surveillance video to determine whether a road pollution event has occurred. Compared with the conventional approach for determining a road pollution event, systems and methods of the present disclosure may be fully or partially automated, more accurate and efficient by, e.g., reducing the workload of the user. In addition, according to some embodiments of the present disclosure, the systems may further determine whether the road pollution event has occurred by determining whether a fourth image captured later than the second image includes the pollutant, which may avoid that some subjects such as a shadow, a water mark, etc. are identified as the first subject, thereby further improving the accuracy of determining of the target event.

FIG. 1 is a schematic diagram illustrating an exemplary monitoring control system according to some embodiments of the present disclosure. In some embodiments, the monitoring control system 100 may be applied in various application scenarios, for example, object monitoring (e.g., pollutants monitoring, vehicle monitoring), etc. As shown in FIG. 1, the monitoring control system 100 may include a server 110, a network 120, a monitoring device 130, a user device 140, and a storage device 150.

The server 110 may be a single server or a server group. The server group may be centralized or distributed (e.g., the server 110 may be a distributed system). In some embodiments, the server 110 may be local or remote. For example, the server 110 may access information and/or data stored in the monitoring device 130, the user device 140, and/or the storage device 150 via the network 120. As another example, the server 110 may be directly connected to the monitoring device 130, the user device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to monitoring to perform one or more functions described in the present disclosure. For example, the processing device 112 may obtain a first monitoring image including a pollutant associated with a monitoring region captured by the monitoring device 130 and information related to the pollutant. The processing device 112 may also determine a second monitoring image including the pollutant based on the first monitoring image and the information related to the pollutant. The second monitoring image may be captured no later than the first monitoring image. The processing device 112 may also determine a third monitoring image including a construction vehicle based on the second monitoring image and a background image which does not include the pollutant. Further, the processing device 112 may determine a target event (e.g., a road pollution event caused by the construction vehicle) that occurs in the monitoring region based on the background image, the second monitoring image, and the third monitoring image. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set computer (RISC), a microprocessor, or the like, or any combination thereof.

In some embodiments, the server 110 may be unnecessary and all or part of the functions of the server 110 may be implemented by other components (e.g., the monitoring device 130, the user device 140) of the monitoring control system 100. For example, the processing device 112 may be integrated into the monitoring device 130 or the user device 140 and the functions of the processing device 112 may be implemented by the monitoring device 130 or the user device 140.

The network 120 may facilitate exchange of information and/or data for the monitoring control system 100. In some embodiments, one or more components (e.g., the server 110, the monitoring device 130, the user device 140, the storage device 150) of the monitoring control system 100 may transmit information and/or data to other component(s) of the monitoring control system 100 via the network 120. For example, the server 110 may obtain the first monitoring image including the pollutant associated with the monitoring region from the monitoring device 130 via the network 120. As another example, the server 110 may transmit the first monitoring image, the background image, the second monitoring image, the third monitoring image, and/or the target event that occurs in the monitoring region to the user device 140 via the network 120. In some embodiments, the network 120 may be any type of wired or wireless network, or combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The monitoring device 130 may be configured to acquire a monitoring image (the "monitoring image" herein refers to a single monitoring image or a frame of a monitoring video). In some embodiments, the monitoring device 130 may include a camera 130-1, a video recorder 130-2, an image sensor 130-3, etc. The camera 130-1 may include a gun camera, a dome camera, an integrated camera, a monocular camera, a binocular camera, a multi-view camera, or the like, or any combination thereof. The video recorder 130-2 may include a PC Digital Video Recorder (DVR), an embedded DVR, or the like, or any combination thereof. The image sensor 130-3 may include a Charge Coupled Device (CCD) image sensor, a Complementary Metal Oxide Semiconductor (CMOS) image sensor, or the like, or any combination thereof. In some embodiments, the monitoring device 130 may include a plurality of components each of which can acquire a monitoring image. For example, the monitoring device 130 may include a plurality of sub-cameras that can capture monitoring images or monitoring videos simultaneously. In some embodiments, the monitoring device 130 may transmit the acquired monitoring image to one or more components (e.g., the server 110, the user device 140, the storage device 150) of the monitoring control system 100 via the network 120.

The user device 140 may be configured to receive information and/or data from the server 110, the monitoring device 130, and/or the storage device 150, via the network 120. For example, the user device 140 may receive the first monitoring image, the background image, the second monitoring image, and the third monitoring image from the server 110. As another example, the user device 140 may receive the target event that occurs in the monitoring region from the server 110. In some embodiments, the user device 140 may process information and/or data received from the server 110, the monitoring device 130, and/or the storage device 150, via the network 120. In some embodiments, the user device 140 may provide a user interface via which a user may view information and/or input data and/or instructions to the monitoring control system 100. For example, the user may view the first monitoring image, the background image, the second monitoring image, and the third monitoring image via the user interface. In some embodiments, the user device 140 may include a mobile phone 140-1, a computer 140-2, a wearable device 140-3, or the like, or any combination thereof. In some embodiments, the user device 140 may include a display that can display information in a human-readable form, such as text, image, audio, video, graph, animation, or the like, or any combination thereof. The display of the user device 140 may include a cathode ray tube (CRT) display, a liquid crystal display (LCD), a light-emitting diode (LED) display, a plasma display panel (PDP), a three-dimensional (3D) display, or the like, or a combination thereof.

The storage device 150 may be configured to store data and/or instructions. The data and/or instructions may be obtained from, for example, the server 110, the monitoring device 130, and/or any other component of the monitoring control system 100. In some embodiments, the storage device 150 may store data and/or instructions that the server 110 may execute or use to perform exemplary methods described in the present disclosure. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the server 110, the monitoring device 130, the user device 140) of the monitoring control system 100. One or more components of the monitoring control system 100 may access the data or instructions stored in the storage device 150 via the network 120. In some embodiments, the storage device 150 may be directly connected to or communicate with one or more components (e.g., the server 110, the monitoring device 130, the user device 140) of the monitoring control system 100. In some embodiments, the storage device 150 may be part of other components of the monitoring control system 100, such as the server 110, the monitoring device 130, or the user device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
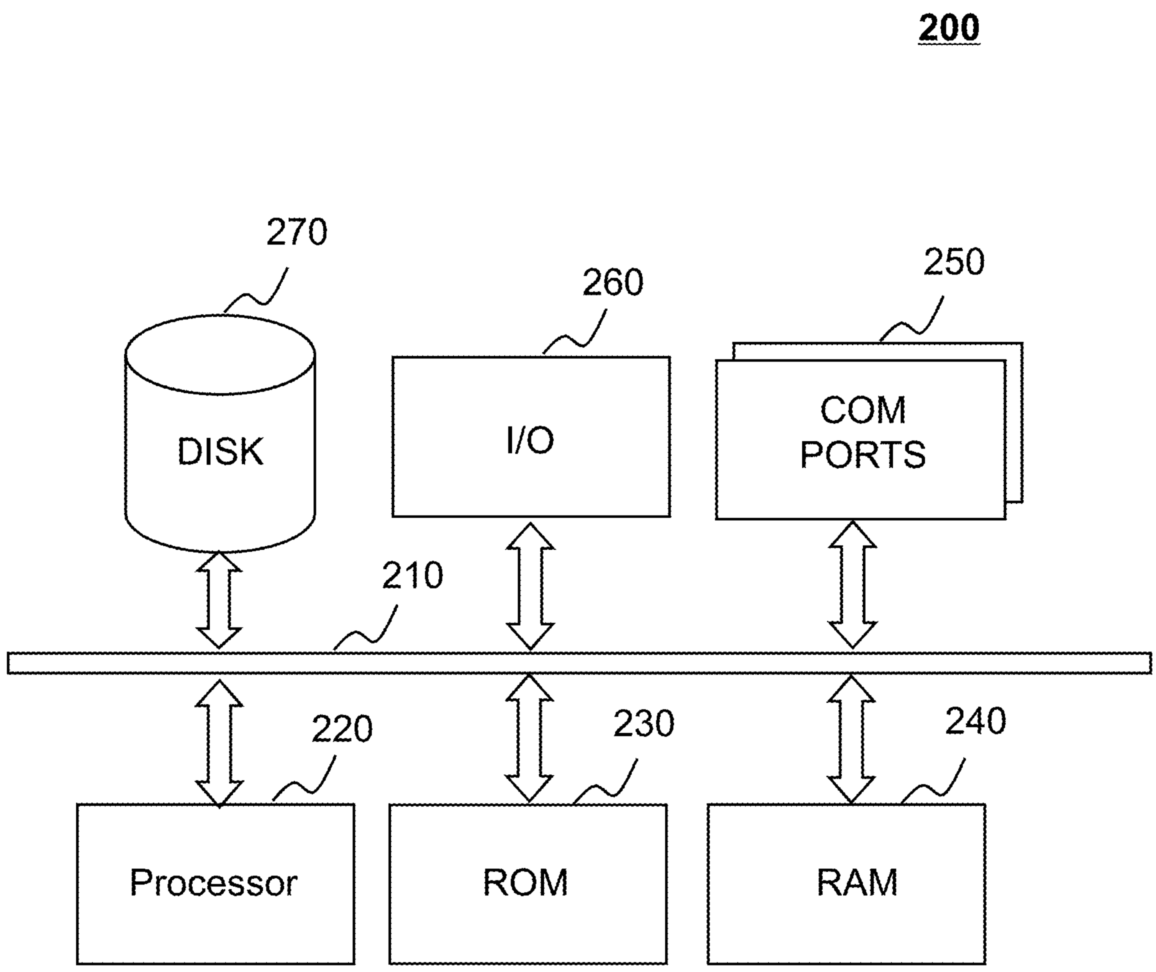
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the monitoring control system 100 as described herein. For example, the processing device 112 may be implemented on the computing device 200, via its hardware, software program, firmware, or a combination thereof. Although only one such computer is shown, for convenience, the computer functions relating to object measurement as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B).

Figure 3:
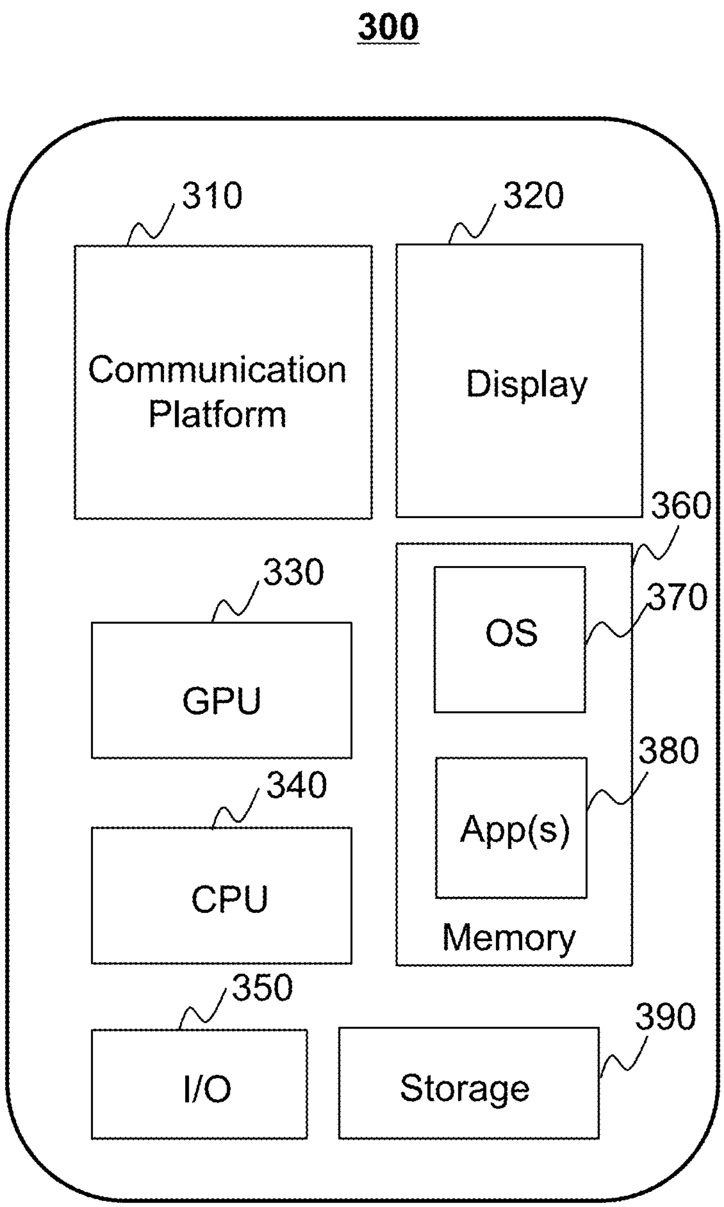
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the user device 140 may be implemented on the mobile device 300 shown in FIG. 3.

As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to monitoring or other information from the processing device 112. User interactions may be achieved via the I/O 350 and provided to the processing device 112 and/or other components of the monitoring control system 100 via the network 120.

Figure 4A:
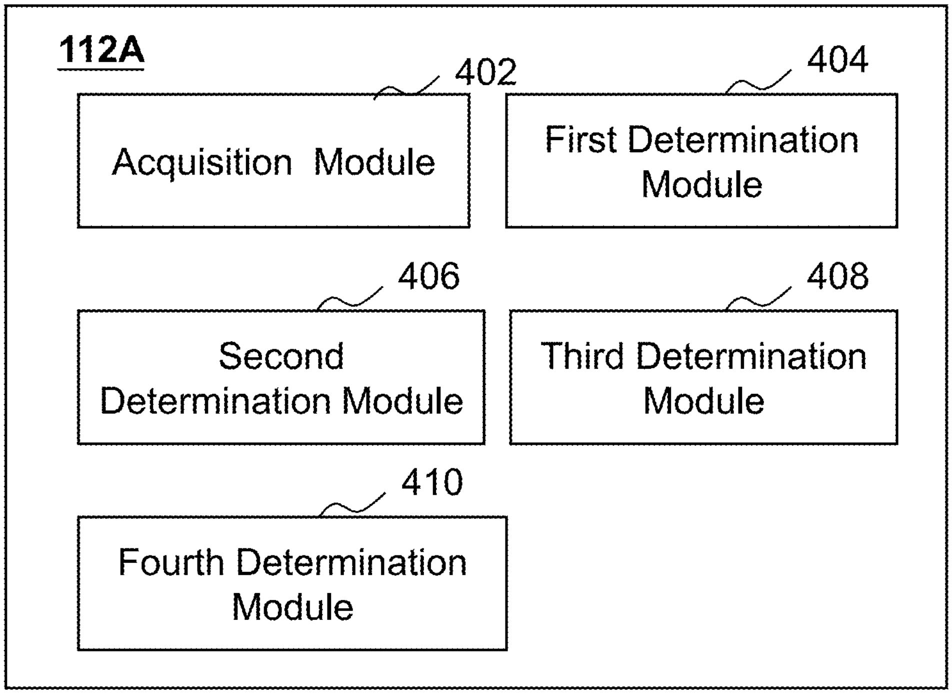
FIG. 4A is a block diagram illustrating exemplary processing device 112A for determining a target event according to some embodiments of the present disclosure.
Figure 4B:
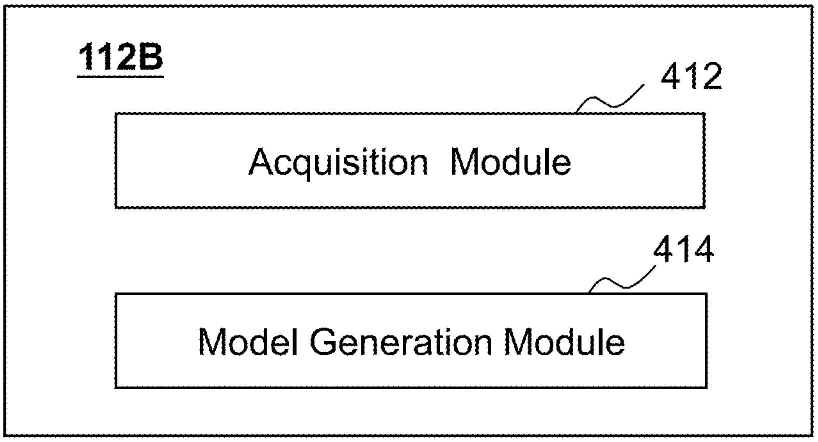
FIG. 4B is a block diagram illustrating exemplary processing device 112B for training a preliminary model according to some embodiments of the present disclosure.

FIG. 4A is a block diagram illustrating exemplary processing device 112A for determining a target event according to some embodiments of the present disclosure. FIG. 4B is a block diagram illustrating exemplary processing device 112B for training a preliminary model according to some embodiments of the present disclosure. The processing devices 112A and 112B may be exemplary processing devices 112 as described in connection with FIG. 1. In some embodiments, the processing device 112A may be configured to apply one or more machine learning models in determining a target event. The processing device 112B may be configured to generate the one or more machine learning models. In some embodiments, the processing devices 112A and 112B may be respectively implemented on a processing unit (e.g., a processor 220 illustrated in FIG. 2 or a CPU 340 as illustrated in FIG. 3). Merely by way of example, the processing devices 112A may be implemented on a CPU 340 of a terminal device, and the processing device 112B may be implemented on a computing device 200. Alternatively, the processing devices 112A and 112B may be implemented on a same computing device 200 or a same CPU 340. For example, the processing devices 112A and 112B may be implemented on a same computing device 200.

As shown in FIG. 4A, the processing device 112A may include an acquisition module 402, a first determination module 404, a second determination module 406, a third determination module 408, and a fourth determination module 410.

The acquisition module 402 may be configured to obtain a first image including a first subject and information related to the first subject. In some embodiments, the first image may be associated with a monitoring region captured by a monitoring device (e.g., the monitoring device 130). In some embodiments, the monitoring region may be a region of a road. The first subject may be a pollutant. Exemplary pollutants may include muck, mud, slime, concrete, slurry, gravel, or the like, or any combination thereof. More descriptions regarding the obtaining of the first image may be found elsewhere in the present disclosure. See, e.g., operation 510 in FIG. 5, and relevant descriptions thereof.

The first determination module 404 may be configured to determine a second image including the first subject based on the first image and the information related to the first subject. The second image may be captured no later than the first image. More descriptions regarding the determination of the second image may be found elsewhere in the present disclosure. See, e.g., operation 520 in FIG. 5, and relevant descriptions thereof.

The second determination module 406 may be configured to determine a third image including a second subject based on the second image. In some embodiments, the second subject may be a movable subject (e.g., a subject moving on a road) such as a construction vehicle. Exemplary construction vehicles may include a muck truck, a mixer truck, or the like, or any combination thereof. In some embodiments, the first subject may be associated with the second subject. More descriptions regarding the determination of the third image may be found elsewhere in the present disclosure. See, e.g., operation 530 in FIG. 5, and relevant descriptions thereof.

The third determination module 408 may be configured to determine a background image which does not include the first subject. As used herein, the background image does not include the first subject, which indicates that a region of the background image corresponding to the position that the first subject is located in the second image does not include the first subject and the region of the background image does not either include other subjects, that is, the region of the background image is not covered by anything. More descriptions regarding the determination of the background image may be found elsewhere in the present disclosure. See, e.g., operation 540 in FIG. 5, and relevant descriptions thereof.

The fourth determination module 510 may be configured to determine a target event based on the background image, the second image, and the third image. As used herein, the target event refers to a road pollution event caused by a movable subject. For example, when a construction vehicle (e.g., a muck truck) is running on a road, some pollutants (e.g., muck or mud) may be leaked or sprinkled on the road, which may cause a road pollution event (i.e., the target event). More descriptions regarding the determination of the target event may be found elsewhere in the present disclosure. See, e.g., operation 550 in FIG. 5, and relevant descriptions thereof.

In some embodiments, the fourth determination module 510 may be configured to determine a fourth image based on the second image, and whether the fourth image includes the first subject based on the information related to the first subject. In response to determine that the fourth image includes the first subject, the fourth determination module 510 may be further configured to determine the target event based on the background image, the second image, the third image, and the fourth image. More descriptions regarding the determination of the target event based on the background image, the second image, the third image, and the fourth image may be found elsewhere in the present disclosure. See, e.g., operation 560-590 in FIG. 5, and relevant descriptions thereof. In some embodiments, in response to determine that the fourth image includes the first subject, the fourth determination module 510 may be further configured to determine that the first subject is a target subject. More descriptions regarding the determination of the target subject may be found elsewhere in the present disclosure. See, e.g., operation 730-760 in FIG. 7, and relevant descriptions thereof.

As shown in FIG. 4B, the processing device 112B may include an acquisition module 412 and a model generation module 414.

The acquisition module 412 may be configured to obtain data used to train one or more machine learning models, such as a first subject detection model, a second subject detection model, disclosed in the present disclosure. For example, the acquisition module 412 may be configured to obtain one or more training samples and a preliminary model.

The model generation module 414 may be configured to generate the one or more machine learning models by model training. In some embodiments, the one or more machine learning models may be generated according to a machine learning algorithm. The machine learning algorithm may include but not be limited to an artificial neural network algorithm, a deep learning algorithm, a decision tree algorithm, an association rule algorithm, an inductive logic programming algorithm, a support vector machine algorithm, a clustering algorithm, a Bayesian network algorithm, a reinforcement learning algorithm, a representation learning algorithm, a similarity and metric learning algorithm, a sparse dictionary learning algorithm, a genetic algorithm, a rule-based machine learning algorithm, or the like, or any combination thereof. The machine learning algorithm used to generate the one or more machine learning models may be a supervised learning algorithm, a semi-supervised learning algorithm, an unsupervised learning algorithm, or the like. More descriptions regarding the generation of the one or more machine learning models may be found elsewhere in the present disclosure. See, e.g., operation 510 in FIG. 5, and relevant descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 112A as described in FIG. 4A and/or the processing device 112B as described in FIG. 4B may share two or more of the modules, and any one of the modules may be divided into two or more units. For instance, the processing device 112A as described in FIG. 4A and the processing device 112B as described in FIG. 4B may share a same acquisition module; that is, the acquisition module 402 and the acquisition module 406 are a same module. In some embodiments, the processing device 112A as described in FIG. 4A and/or the processing device 112B as described in FIG. 4B may include one or more additional modules, such as a storage module (not shown) for storing data. In some embodiments, the processing device 112A as described in FIG. 4A and the processing device 112B as described in FIG. 4B may be integrated into one processing device 112.

Figure 5:
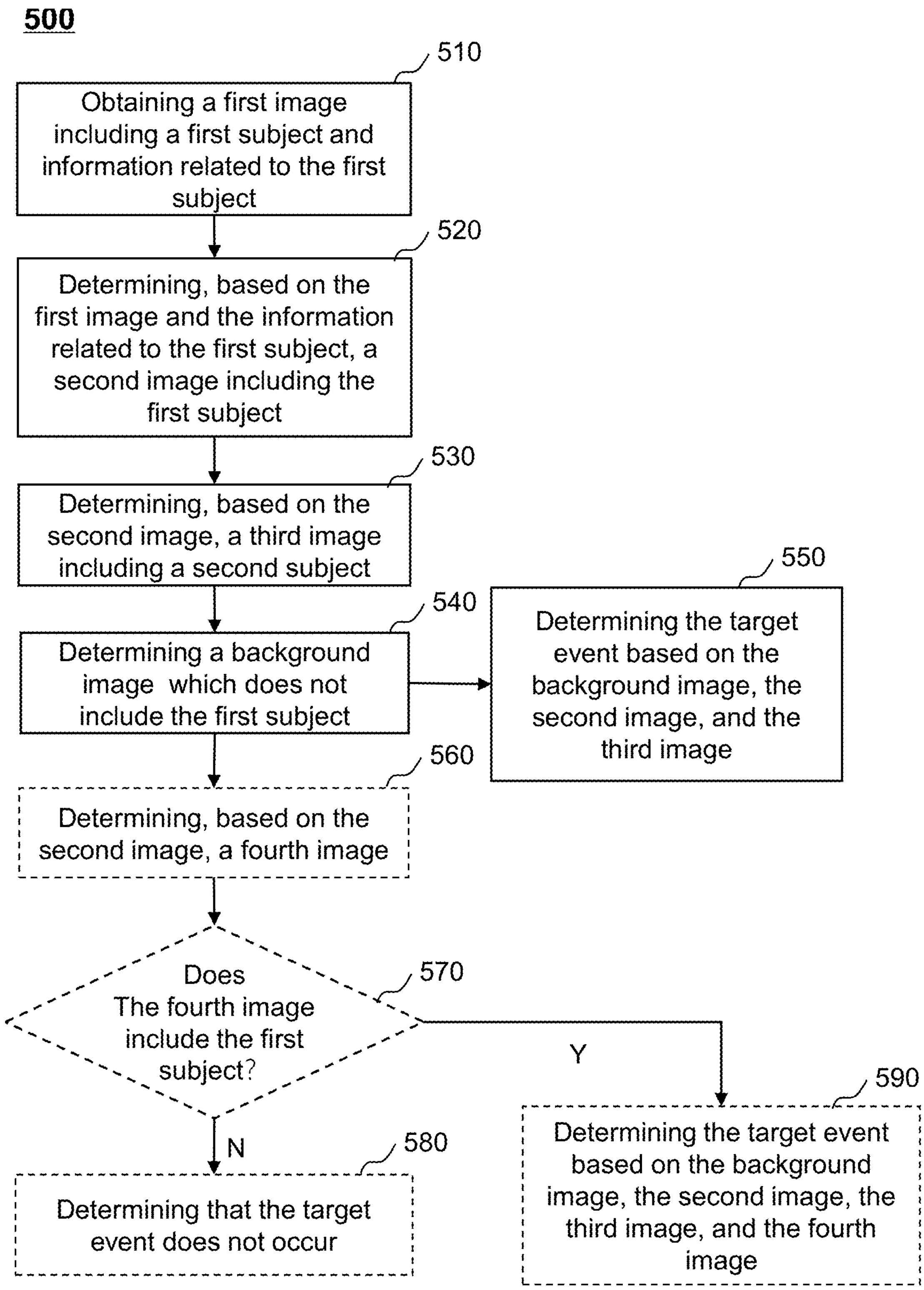
FIG. 5 is a flowchart illustrating an exemplary process for determining a target event according to some embodiments of the present disclosure.

FIG. 5 is a flowchart illustrating an exemplary process for determining a target event according to some embodiments of the present disclosure. In some embodiments, a process 500 may be executed by the monitoring control system 100. For example, the process 500 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

As used herein, the target event refers to a road pollution event caused by a movable subject. For example, when a construction vehicle (e.g., a muck truck) is running on a road, some pollutants (e.g., muck or mud) may be leaked or sprinkled on the road, which may cause a road pollution event (i.e., the target event).

In 510, the processing device 112A (e.g., the acquisition module 402) may obtain a first image including a first subject and information related to the first subject.

In some embodiments, the first image may be associated with a monitoring region captured by a monitoring device (e.g., the monitoring device 130). In some embodiments, the monitoring region may be a region of a road. The first subject may be a pollutant. Exemplary pollutants may include muck, mud, slime, concrete, slurry, gravel, or the like, or any combination thereof. The information related to the first subject may include at least a type of the first subject and a position of the first subject in the first image. In some embodiments, the information related to the first subject may further include a shape of the first subject, a size of the first subject, a color of the first subject, or the like, or any combination thereof.

In some embodiments, the processing device 112A may direct the monitoring device 130 to sequentially capture one or more monitoring images associated with the monitoring region. In some embodiments, the processing device 112A may obtain or determine the one or more monitoring images from a monitoring video captured by the monitoring device 130. For example, the processing device 112A may perform a framing operation on the monitoring video to obtain a plurality of frames in the monitoring video. The processing device 112A may designate one or more consecutive frames in the plurality of frames as the one or more monitoring images.

In some embodiments, the one or more monitoring images associated with the monitoring region may be previously acquired by the monitoring device 130 and stored in a storage device (e.g., the storage device 150, the ROM 230, the RAM 240, and/or the storage 390). The processing device 112A may obtain the one or more monitoring images from the storage device via a network (e.g., the network 120).

In some embodiments, the processing device 112A may determine the first image including the first subject and the information related to the first subject using a first subject detection model based on the one or more monitoring images. The first subject detection model may be a trained model (e.g., a machine learning model) used for subject detection. Merely by way of example, a monitoring image may be input into the first subject detection model, and the first subject detection model may output a determination result of whether the monitoring image includes the first subject. If the determination result indicates that the monitoring image includes the first subject, the processing device 112A may designate the monitoring image as the first image, and the first subject detection model may output the information related to the first subject (e.g., the type of the first subject and/or the position of the first subject in the first image). Exemplary first subject detection models may include a Region-Convolutional Neural Network (R-CNN) model, a You only look once (YOLO) model, or the like, or any combination thereof.

In some embodiments, the processing device 112A may obtain the first subject detection model from one or more components of the monitoring control system 100 (e.g., the storage device 150) or an external source via a network (e.g., the network 120). For example, the first subject detection model may be previously trained by a computing device (e.g., the processing device 112B), and stored in a storage device (e.g., the storage device 150, the storage 220, and/or the storage 390) of the monitoring control system 100. The processing device 112A may access the storage device and retrieve the first subject detection model. In some embodiments, the first subject detection model may be generated according to a machine learning algorithm as described elsewhere in this disclosure (e.g., FIG. 4B and the relevant descriptions).

Merely by way of example, the first subject detection model may be trained according to a supervised learning algorithm by the processing device 112B or another computing device (e.g., a computing device of a vendor of the first subject detection model). The processing device 112B may obtain one or more training samples and a preliminary model. Each training sample may include a sample image including a sample subject, a sample type of the sample subject, and a sample position of the sample subject in the sample image. The sample type of the sample subject and the sample position of the sample subject in the sample image may be annotated (e.g., by a user) as a ground truth determination result. The preliminary model to be trained may include one or more model parameters, such as the number (or count) of layers, the number (or count) of nodes, a loss function, or the like, or any combination thereof. Before training, the preliminary model may have one or more initial parameter values of the model parameter(s).

The training of the preliminary model may include one or more iterations to iteratively update the model parameters of the preliminary model based on the training sample(s) until a termination condition is satisfied in a certain iteration. Exemplary termination conditions may be that the value of a loss function obtained in the certain iteration is less than a threshold value, that a certain count of iterations has been performed, that the loss function converges such that the difference of the values of the loss function obtained in a previous iteration and the current iteration is within a threshold value, etc. The loss function may be used to measure a discrepancy between a determination result predicted by the preliminary model in an iteration and the ground truth determination result. For example, the sample image of each training sample may be input into the preliminary model, and the preliminary model may output a predicted type of the sample subject and a predicted position of the sample subject in the sample image. The loss function may be used to measure a difference between the predicted type and the sample type of the sample subject and a difference between a predicted position and the sample position of the sample subject in the sample image of each training sample. Exemplary loss functions may include a focal loss function, a log loss function, a cross-entropy loss, a Dice ratio, or the like. If the termination condition is not satisfied in the current iteration, the processing device 112B may further update the preliminary model to be used in a next iteration according to, for example, a backpropagation algorithm. If the termination condition is satisfied in the current iteration, the processing device 112B may designate the preliminary model in the current iteration as the first subject detection model.

In some embodiments, the processing device 112A may obtain an initial image including the first subject. The processing device 112A may determine whether a clarity of the initial image exceeds a first threshold. The first threshold may be set manually by a user (e.g., an engineer) according to an experience value or a default setting of the monitoring control system 100, or determined by the processing device 112A according to an actual need. In response to determining that the clarity of the initial image exceeds the first threshold, the processing device 112A may designate the initial image as the first image. In response to determining that the clarity of the initial image does not exceed the first threshold, the processing device 112A may determine that the target event does not occur, and obtain an additional initial image including the first subject to determine whether the clarity of the additional initial image exceeds the first threshold.

In 520, the processing device 112A (e.g., the first determination module 404) may determine, based on the first image and the information related to the first subject, a second image including the first subject. The second image may be captured no later than the first image.

In some embodiments, the processing device 112A may determine a first target region of the first image based on the position of the first subject in the first image. The first target region refers to a region where the first subject is located in the first image.

In some embodiments, the processing device 112A may obtain a plurality of first historical images which are captured earlier than the first image. Each of the plurality of first historical image may include a first reference region corresponding to the first target region of the first image. In some embodiments, each of the plurality of first historical image and the first image may include the same monitoring region. The plurality of first historical images and the first image may be monitoring images captured by a same monitoring device (e.g., the monitoring device 130) or different monitoring devices. More descriptions for the obtaining of the monitoring images may be found elsewhere in the present disclosure. See, e.g., operation 510 in FIG. 5 and relevant descriptions thereof.

In some embodiments, the processing device 112A may determine a similarity between the first reference region of each of the plurality of first historical image and the first target region of the first image. In some embodiments, the processing device 112A may extract image features of the first reference region of each of the plurality of first historical image and image features of the first target region of the first image. Exemplary image features may include color features, shape features, size features, etc. For example, the processing device 112A may extract image features of the first reference region of each of the plurality of first historical image and image features of the first target region of the first image using a feature extraction algorithm. Exemplary feature extraction algorithms may include a scale invariant feature transform (SIFT) algorithm, an average amplitude difference function (AMDF) algorithm, a histogram of gradient (HOG) algorithm, a speeded up robust features (SURF) algorithm, a local binary pattern (LBP) algorithm, etc. The processing device 112A may determine the similarity between the first reference region of each of the plurality of first historical image and the first target region of the first image based on the image features of the first reference region of each of the plurality of first historical image and image features of the first target region of the first image.

In some embodiments, the processing device 112A may determine the similarity between the first reference region of each of the plurality of first historical image and the first target region of the first image using a similarity algorithm. Exemplary similarity algorithms may include a Euclidean distance algorithm, a Manhattan distance algorithm, a Minkowski distance algorithm, a cosine similarity algorithm, a Jaccard similarity algorithm, a Pearson correlation algorithm, or the like, or any combination thereof.

In some embodiments, the processing device 112A may determine whether one or more first candidate images of the plurality of first historical images include the first subject based on the similarities between the first reference regions of the plurality of first historical images and the first target region of the first image. Merely by way of example, the processing device 112A may determine that one or more first historical images whose similarities exceed a second threshold include the first subject, that is, the processing device 112A may determine the one or more first historical images including the first subject as the one or more first candidate images. The second threshold may be set manually by a user (e.g., an engineer) according to an experience value or a default setting of the monitoring control system 100, or determined by the processing device 112A according to an actual need, such as 90%, 95%, 99%, etc.

In some embodiments, the processing device 112A may input each of the plurality of first historical images into the first subject detection model, and the first subject detection model may output a determination result of whether the first historical image includes a first reference subject. The first reference subject may be the same as or similar to the first subject. If the determination result indicates that the first historical image includes the reference subject, the processing device 112A may designate the first historical image as a first reference image, and the first subject detection model may output the information related to the first reference subject (e.g., the type of the first reference subject and the position of the first reference subject in the first reference image). The processing device 112A may compare the information related to the first reference subject with the information related to the first subject to determine whether the first reference subject is the first subject. For example, if the type of the first reference subject and the position of the first reference subject in the first reference image are the same as the type of the first subject and the position of the first subject in the second image, the processing device 112A may determine that the first reference subject is the first subject, that is, the first reference image includes the first subject. The processing device 112A may further designate the first reference image including the first subject as a first candidate image.

In response to determining that one or more first candidate images of the plurality of first historical images include the first subject, the processing device 112A may further determine a first candidate image as the second image from the one or more first candidate images. For example, the processing device 112A may determine the first candidate image captured at the earliest as the second image from the one or more first candidate images. In some embodiments, the processing device 112A may determine one or more first candidate images whose clarities exceed a third threshold as one or more final first candidate images from the one or more first candidate images. The processing device 112A may further determine a first candidate image as the second image from the one or more final first candidate images. The third threshold may be set manually by a user (e.g., an engineer) according to an experience value or a default setting of the monitoring control system 100, or determined by the processing device 112A according to an actual need.

In response to determining that no first candidate image includes the first subject, the processing device 112A may designate the first image as the second image.

In some embodiments, the processing device 112A may obtain a plurality of first historical images which are captured within some time (e.g., 5 minutes, 10 minutes, etc.) earlier than the first image. The processing device 112A may determine whether each of the plurality of first historical images includes the first subject. In response to determining that each of the plurality of first historical images includes the first subject, which means the first appearance of the first subject happens even earlier the plurality of first historical images, the processing device 112A may stop searching historical images including the first subject and determine that the target event does not occur. In response to determining that at least one of the plurality of first historical images does not include the first subject, the processing device 112A may determine the second image including the first subject based on the first image and the information related to the first subject.

In 530, the processing device 112A (e.g., the second determination module 406) may determine, based on the second image, a third image including a second subject.

In some embodiments, the second subject may be a movable subject (e.g., a subject moving on a road) such as a construction vehicle. Exemplary construction vehicles may include a muck truck, a mixer truck, or the like, or any combination thereof. In some embodiments, the first subject may be associated with the second subject. For example, the first subject may come from the second subject. In some embodiments, the first subject may leave the second subject while the second subject is moving. For example, the muck truck may leak or sprinkle pollutants such as muck or mud while a muck truck is running on a road.

In some embodiments, the processing device 112A may obtain a plurality of second historical images which are captured earlier than the second image. In some embodiments, each of the plurality of second historical images and the second image may include the same monitoring region. The plurality of second historical images and the second image may be monitoring images captured by a same monitoring device (e.g., the monitoring device 130) or different monitoring devices. More descriptions for the obtaining of the monitoring images may be found elsewhere in the present disclosure. See, e.g., operation 510 in FIG. 5 and relevant descriptions thereof.

In some embodiments, the processing device 112A may determine whether one or more initial second candidate images of the plurality of second historical images include the second subject using a second subject detection model. Merely by way of example, a second historical image may be input into the second subject detection model, and the second subject detection model may output a determination result of whether the second historical image includes the second subject. If the determination result indicates that the second historical image includes the second subject, the processing device 112A may designate the second historical image as an initial second candidate image, and the second subject detection model may output the information related to the second subject (e.g., the type of the second subject and the position of the second subject in the second historical image). In some embodiments, obtaining of the second subject detection model may be performed in a similar manner as that of the first subject detection model as described elsewhere in this disclosure, and the descriptions of which are not repeated here.

In response to determining that no initial second candidate image include the second subject, the processing device 112A may further determine that the target event does not occur.

In response to determining that one or more initial second candidate images of the plurality of second historical images include the second subject, the processing device 112A may directly determine an initial second candidate image as the third image from the one or more initial second candidate images. For example, the processing device 112A may determine an initial second candidate image captured at the latest as the third image from the one or more initial second candidate images.

In some embodiments, the processing device 112A may determine one or more second candidate images, among the initial second candidate image(s), based on the position information of the second subject in each of the initial second candidate image(s) and the position information of the first subject in the second image. For example, if the second subject in an initial second candidate image is located within a certain threshold distance with respect to the first subject, that is, a distance between the second subject in the initial second candidate image and the first subject is within a certain threshold distance, the processing device 112A may determine the initial second candidate image as a second candidate image. The processing device 112A may further determine a second candidate image captured at the latest as the third image from the one or more second candidate images. In some embodiments, the processing device 112A may determine one or more second candidate images whose clarities exceed a fourth threshold as one or more final second candidate images from the one or more second candidate images. The processing device 112A may further determine a second candidate image as the third image from the one or more final second candidate images.

In 540, the processing device 112A (e.g., the third determination module 408) may determine a background image which does not include the first subject.

As used herein, the background image does not include the first subject, which indicates that a region of the background image corresponding to the position that the first subject is located in the second image does not include the first subject and the region of the background image does not either include other subjects, that is, the region of the background image is not covered by anything.

In some embodiments, the processing device 112A obtain a plurality of third historical images which are captured earlier than the third image. In some embodiments, each of the plurality of third historical images and the third image (or the second image) may include the same monitoring region. The plurality of third historical images and the third image may be monitoring images captured by a same monitoring device (e.g., the monitoring device 130) or different monitoring devices. More descriptions for the obtaining of the monitoring images may be found elsewhere in the present disclosure. See, e.g., operation 510 in FIG. 5 and relevant descriptions thereof.

In some embodiments, the processing device 112A may determine one or more third candidate images each of which does not include the first subject based on the plurality of third historical images and the information related to the first subject. In some embodiments, the processing device 112A may determine the one or more third candidate images using the first subject detection model. Merely by way of example, a third historical image may be input into the first subject detection model, and the first subject detection model may output a determination result of whether the third historical image includes the first subject. If the determination result indicates that the third historical image does not include the first subject, the processing device 112A may designate the third historical image as a third candidate image.

In some embodiments, the processing device 112A may determine a third candidate image as the background image from the one or more third candidate images. For example, the processing device 112A may determine a third candidate image captured at the latest as the background image from the one or more third candidate images. In some embodiments, the processing device 112A may determine one or more third candidate images whose clarities exceed a fifth threshold as one or more final third candidate images from the one or more third candidate images. The processing device 112A may further determine a final third candidate image (e.g., a final third candidate image captured at the latest) as the background image from the one or more final third candidate images.

In 550, the processing device 112A (e.g., the fourth determination module 410) may determine the target event based on the background image, the second image, and the third image.

Figure 6A:
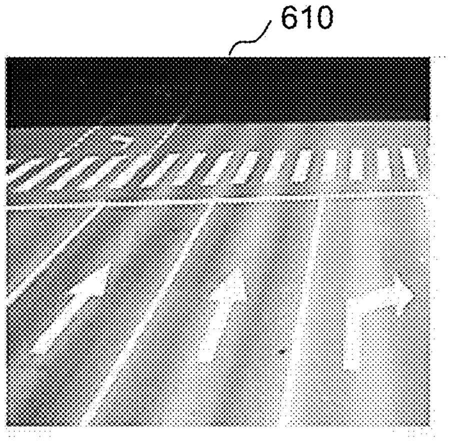
FIG. 6A is a schematic diagram illustrating an exemplary background image according to some embodiments of the present disclosure.
Figure 6B:
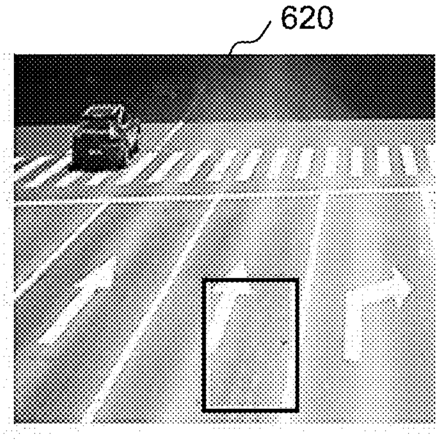
FIG. 6B is a schematic diagram illustrating an exemplary second image according to some embodiments of the present disclosure.

In some embodiments, the processing device 112A may determine a second target region of the second image based on the position of the first subject in the second image. The second target region refers to a region of the second image including the first subject. The second target region may be marked with a bounding box enclosing the first subject. The bounding box may have the shape of a square, a rectangle, a triangle, a polygon, a circle, an ellipse, an irregular shape, or the like. Merely by way of example, FIG. 6B is a schematic diagram illustrating an exemplary second image 620 according to some embodiments of the present disclosure. As shown in FIG. 6B, a black square box is a bounding box enclosing the first subject. In some embodiments, the second target region may be manually marked with a bounding box enclosing the first subject by a user by, for example, drawing the bounding box on the second image displayed on a user interface. In some embodiments, the second target region may be automatically marked with a bounding box enclosing the first subject by the processing device 112A or the first subject detection model.

Figure 6C:
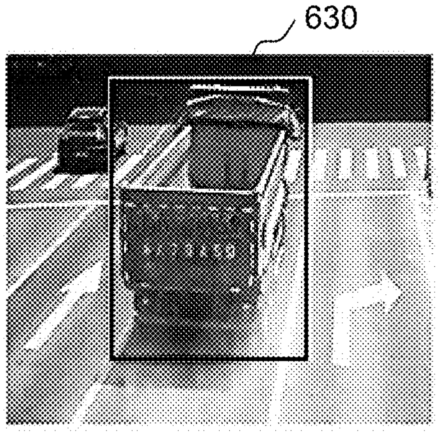
FIG. 6C is a schematic diagram illustrating an exemplary third image according to some embodiments of the present disclosure.

In some embodiments, the processing device 112A may determine a third target region of the third image based on the position of the second subject in the third image. The third target region refers to a region of the third image including the second subject. The third target region may be marked with a bounding box enclosing the second subject. In some embodiments, the marking of the third target region may be performed in a similar manner as that of the second target region, and the descriptions of which are not repeated here. Merely by way of example, FIG. 6C is a schematic diagram illustrating an exemplary third image 630 according to some embodiments of the present disclosure. As shown in FIG. 6C, a black square box is a bounding box enclosing the second subject.

In some embodiments, the processing device 112A may determine the target event based on the background image, the second image, and the third image. For example, FIG. 6A is a schematic diagram illustrating an exemplary background image 610 according to some embodiments of the present disclosure. As shown in FIGS. 6A-6C, the processing device 112A may determine that the target event, e.g., some pollutants (e.g., muck or mud) are leaked or sprinkled on the road by a construction truck, has occurred based on the background image 610, the second image 620, and the third image 630.

In some embodiments, the processing device 112A may send the background image, the marked second image, the marked third image, and a prompt message indicating that the target event has occurred to a user terminal.

In some embodiments, the processing device 112A may obtain identity information of the second subject based on the third image. In some embodiments, the processing device 112A may identity a license plate of the second subject. The license plate of the second subject may be mounted on the front and/or the back of the second subject. The license plate may be a rectangular plate with a numeric or alphanumeric ID of the second subject. The license plate may have a background colour (e.g., blue, green, white) that is different from the colour of the numeric or alphanumeric ID. The processing device 112A may identify the numeric or alphanumeric ID of the second subject from the license plate. The processing device 112A may further determine the numeric or alphanumeric ID of the second subject as the identity information of the second subject.

In some embodiments, if the identity information of the second subject is not obtained based on the third image, the processing device 112A may obtain the identity information of the second subject base on one or more second reference images including the second subject. The one or more second reference images and the third image may be captured by a same monitoring device (e.g., the monitoring device 130) or different monitoring devices. Merely by way of example, the processing device 112A may obtain a plurality of fourth historical images each of which includes a part of a motion trajectory of the second subject. The processing device 112A may determine one or more fourth candidate images of the plurality of fourth historical images each of which includes a second reference subject using the second subject detection model. As used herein, a second reference subject of a fourth candidate image may be the same as or similar to the second subject. The processing device 112A determine a similarity between the second reference subject in each of the one or more fourth candidate images and the second subject. In some embodiments, the determining of the similarity between the second reference subject and the second subject may be performed in a similar manner as that of the similarity between the first reference region and the first target region described in operation 520, and the descriptions of which are not repeated. The processing device 112A may determine one or more fourth candidate images whose similarities exceed a first similarity threshold as the one or more second reference images. The processing device 112A may identify license plates of the one or more second reference images. The processing device 112A may further identify the numeric or alphanumeric ID of the second subject from the license plates of the one or more second reference images to obtain the identity information of the second subject.

In some embodiments, the processing device 112A may further send the identity information of the second subject to the user terminal.

In some embodiments, the user terminal may send a message indicating whether the target event has been determined to the processing device 112A. The processing device 112A may mark all images including the first subject in the monitoring region each of which is captured later than the first image to indicate that the first subject in the images has been confirmed, which may avoid repeated determination of the target event.

In 560, the processing device 112A (e.g., the fourth determination module 410) may determine, based on the second image, a fourth image.

The fourth image may be captured later than the second image. In some embodiments, the fourth image may be captured no less than a time threshold later than the second image. The time threshold may be determined according to a season, an environment temperature, etc. For example, the time threshold in winter may be longer than the time threshold in summer. As another example, the time threshold in a low temperature environment may be longer than the time threshold in a high temperature environment. The time threshold may be set manually by a user (e.g., an engineer) according to an experience value or a default setting of the monitoring control system 100, or determined by the processing device 112A according to an actual need, such as 30 minutes, 1 hour, etc.

In some embodiments, the fourth image and the second image may include a same monitoring region. The fourth image and the second image may be monitoring images captured by a same monitoring device (e.g., the monitoring device 130) or different monitoring devices. More descriptions for the obtaining of the monitoring images may be found elsewhere in the present disclosure. See, e.g., operation 510 in FIG. 5 and relevant descriptions thereof.

In 570, the processing device 112A (e.g., the fourth determination module 410) may determine whether the fourth image includes the first subject based on the information related to the first subject.

In some embodiments, the processing device 112A may obtain a fourth target region of the fourth image corresponding to the position of the first subject. The processing device 112A may determine whether the fourth image includes the first subject in the fourth target region. In some embodiments, the processing device 112A determine a similarity between the fourth target region of the fourth image and a region of the second image corresponding to the first subject. In some embodiments, the determining of the similarity between the fourth target region and a region of the second image corresponding to the first subject may be performed in a similar manner as that of the similarity between the first reference region and the first target region described in operation 520, and the descriptions of which are not repeated. The processing device 112A may determine whether the fourth image includes the first subject in the fourth target region based on the similarity between the fourth target region and the region of the second image corresponding to the first subject. The processing device 112A may determine that the fourth image includes the first subject in the fourth target region if the similarity between the fourth target region and the region of the second image corresponding to the first subject exceeds a second similarity threshold (e.g., 80%, 85%, etc.). The processing device 112A may determine that the fourth image does not include the first subject in the fourth target region if the similarity between the fourth target region and the region of the second image corresponding to the first subject does not exceed the second similarity threshold.

In some embodiments, the processing device 112A may input the fourth image into the first subject detection model, and the first subject detection model may output a determination result of whether the fourth image includes a third reference subject. The third reference subject may be the same as or similar to the first subject. If the determination result indicates that the fourth image does not include the third reference subject, the processing device 112A may determine that the fourth image does not include the first subject. If the determination result indicates that the fourth image includes the third reference subject, the processing device 112A may output the information related to the third reference subject (e.g., the type of the third reference subject and the position of the third reference subject in the fourth image). The processing device 112A may compare the information related to the third reference subject with the information related to the first subject to determine whether the third reference subject is the first subject. For example, if the type of the third reference subject and the position of the third reference subject in the fourth image are the same as the type of the first subject and the position of the first subject in the second image, the processing device 112A may determine that the third reference subject is the first subject, that is, the fourth image includes the first subject. If the type of the third reference subject is different from the type of the first subject, the processing device 112A may determine that the third reference subject is not the first subject, that is, the fourth image does not include the first subject. If the position of the third reference subject in the fourth image is different from the position of the first subject in the second image, the processing device 112A may determine that the third reference subject is not the first subject, that is, the fourth image does not include the first subject.

In response to determining that the fourth image includes the first subject, the processing device 112A may perform operation 590. In response to determining that the fourth image does not include the first subject, the processing device 112A may perform operation 580.

In 580, the processing device 112A (e.g., the fourth determination module 410) may determine that the target event does not occur.

In 590, the processing device 112A (e.g., the fourth determination module 410) may determine the target event based on the background image, the second image, the third image, and the fourth image.

Figure 6D:
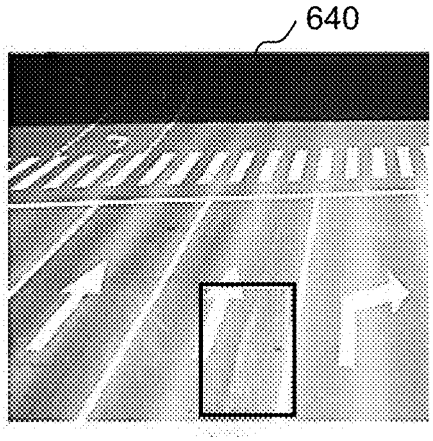
FIG. 6D is a schematic diagram illustrating an exemplary fourth image according to some embodiments of the present disclosure.

In some embodiments, a region of the fourth image including the fourth target region may be marked with a bounding box enclosing the first subject. In some embodiments, the marking of the region of the fourth image including the fourth target region may be performed in a similar manner as that of the second target region described in operation 550, and the descriptions of which are not repeated here. Merely by way of example, FIG. 6D is a schematic diagram illustrating an exemplary fourth image 640 according to some embodiments of the present disclosure. As shown in FIG. 6B, a black square box is a bounding box enclosing the first subject.

The processing device 112A may determine the target event based on the background image, the second image, the third image, and the fourth image. As shown in FIGS. 6A-6D, the processing device 112A may determine that the target event has occurred based on the background image 610, the second image 620, the third image 630, and the fourth image 640. In some embodiments, the processing device 112A may send the background image, the marked second image, the marked third image, the marked fourth image, and a prompt message indicating that the target event has occurred to a user terminal. In some embodiments, the processing device 112A may further send the identity information of the second subject to the user terminal.

Conventionally, a user needs to manually check a surveillance video to determine whether a road pollution event has occurred. Compared with the conventional approach for determining a road pollution event, according some embodiments of the present disclosure, the processing device 112A may determine the second image, the third image, and the background image based on the first image and the information related to the first subject, and further determine the target event based on the second image, the background image, and the third image, which may be fully or partially automated, more accurate and efficient by, e.g., reducing the workload of the user. In addition, some subjects such as a shadow, a water mark, etc. may have some characteristics (e.g., a color, a shape, etc.) similar to the first object, which may be mistakenly identified as the first subject. However, these subjects may change drastically over time, for example, the water mark may disappear over time. According to some embodiments of the present disclosure, the processing device 112A may further determine whether the target event has occurred by determining whether the fourth image includes the first subject, which may avoid that some subjects such as a shadow, a water mark, etc. are mistakenly identified as the first subject, thereby further improving the accuracy of determining of the target event.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 500 may be accomplished with one or more additional operations not described and/or without one or more of the operations discussed above. For example, the process 1500 may include an additional storing operation to store information and/or data (e.g., the second image, the third image, the background image, the fourth image, etc.) in a storage device (e.g., the storage device 150) disclosed elsewhere in the present disclosure.

Figure 7:
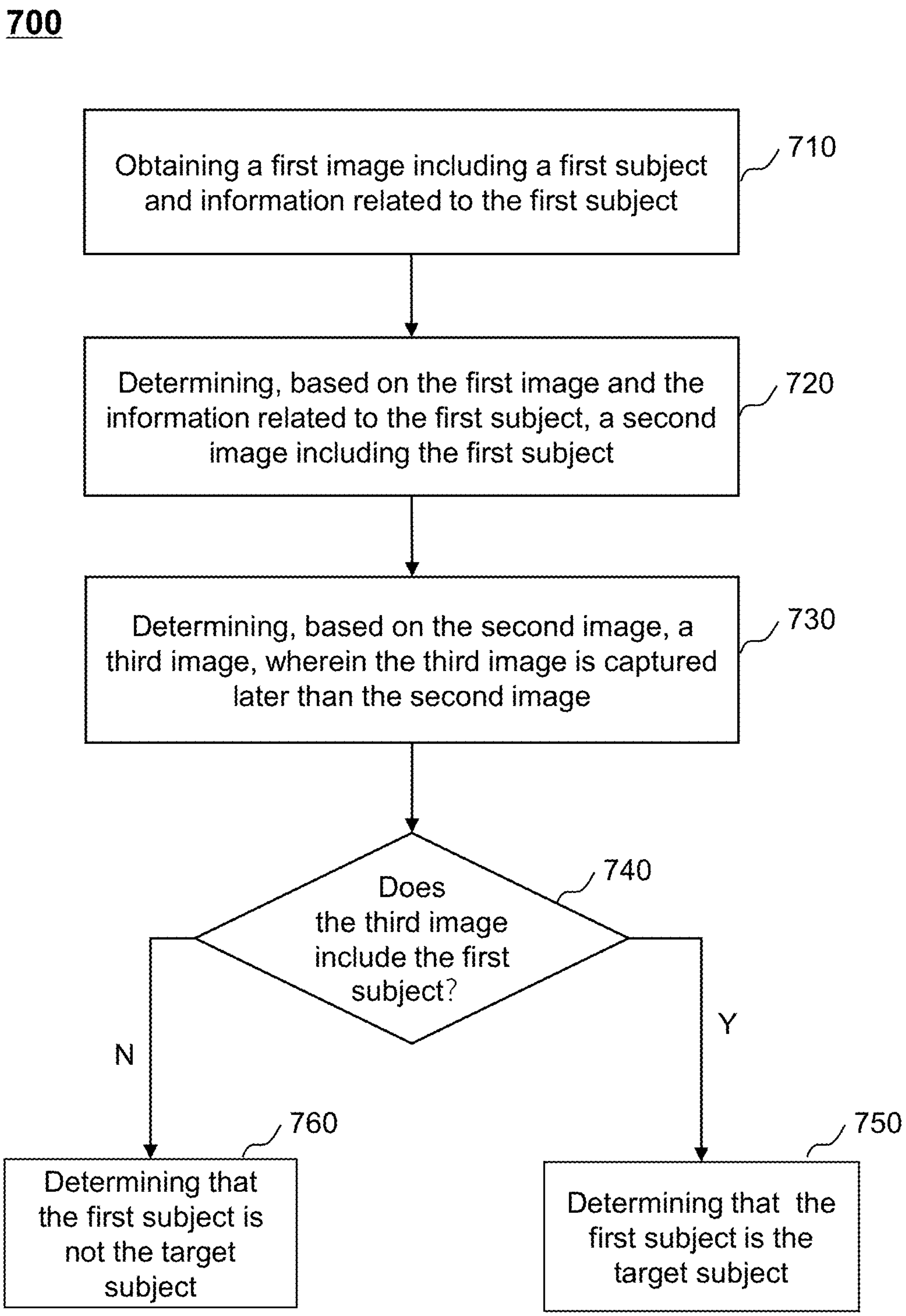
FIG. 7 is a flowchart illustrating an exemplary process for determining a target subject according to some embodiments of the present disclosure.

FIG. 7 is a flowchart illustrating an exemplary process for determining a target subject according to some embodiments of the present disclosure. In some embodiments, a process 700 may be executed by the monitoring control system 100. For example, the process 700 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) may execute the set of instructions and may accordingly be directed to perform the process 700. The operations of the illustrated process presented below are intended to be illustrative. In some embodiments, the process 700 may be accomplished with one or more additional operations not described and/or without one or more of the operations discussed. Additionally, the order of the operations of process 700 illustrated in FIG. 7 and described below is not intended to be limiting.

As used herein, the target subject refers to a pollutant. Exemplary pollutants may include muck, mud, slime, concrete, slurry, gravel, or the like, or any combination thereof.

In 710, the processing device 112A (e.g., the acquisition module 402) may obtain a first image including a first subject and information related to the first subject.

In some embodiments, the first image may be associated with a monitoring region captured by a monitoring device (e.g., the monitoring device 130). In some embodiments, the monitoring region may be a region of a road. The information related to the first subject may include at least a type of the first subject and a position of the first subject in the first image. In some embodiments, the information related to the first subject may further include a shape of the first subject, a size of the first subject, a color of the first subject, or the like, or any combination thereof. In some embodiments, the operation 710 may be similar to or the same as the operation 510 of the process 500 as illustrated in FIG. 5.

In 720, the processing device 112A (e.g., the first determination module 404) may determine, based on the first image and the information related to the first subject, a second image including the first subject. The second image may be captured no later than the first image.

In some embodiments, the processing device 112A may obtain a plurality of first historical images which are captured earlier than the first image. The processing device 112A may determine whether one or more first candidate images of the plurality of first historical images include the first subject. In response to determining that one or more first candidate images of the plurality of first historical images include the first subject, the processing device 112A may further determine a first candidate image as the second image from the one or more first candidate images. In response to determining that no first candidate image includes the first subject, the processing device 112A may designate the first image as the second image. In some embodiments, the operation 720 may be similar to or the same as the operation 520 of the process 500 as illustrated in FIG. 5.

In 730, the processing device 112A (e.g., the fourth determination module 410) may determine, based on the second image, a fifth image.

The fifth image may be captured later than the second image. In some embodiments, the fifth image may be captured no less than a time threshold later than the second image. The time threshold may be determined according to a season, an environment temperature, etc. In some embodiments, the fifth image may be the same as or similar to the fourth image described in operation 560 in FIG. 5. In some embodiments, the operation 730 may be similar to or the same as the operation 560 of the process 500 as illustrated in FIG. 5.

In 740, the processing device 112A (e.g., the fourth determination module 410) may determine whether the fifth image includes the first subject based on the information related to the first subject.

In some embodiments, the processing device 112A may obtain a fifth target region of the fifth image corresponding to the position of the first subject. The processing device 112A may determine whether the fifth image includes the first subject in the fifth target region. In some embodiments, the operation 740 may be similar to or the same as the operation 570 of the process 500 as illustrated in FIG. 5.

In response to determining that the fifth image includes the first subject, the processing device 112A may perform operation 750. In response to determining that the fifth image does not include the first subject, the processing device 112A may perform operation 760.

In 750, the processing device 112A (e.g., the fourth determination module 410) may determine that the first subject is the target subject.

In some embodiments, after that the first subject is the target subject is determined, the processing device 112A may determine a background image which does not include the first subject and a sixth image including a second subject based on the second image. In some embodiments, the second subject may be a movable subject (e.g., a subject moving on a road) such as a construction vehicle. Exemplary construction vehicles may include a muck truck, a mixer truck, or the like, or any combination thereof. The first subject may be associated with the second subject. In some embodiments, the sixth image may be the same as or similar to the third image described in operation 530 in FIG. 5. More descriptions for the determining of the background image and third image may be found elsewhere in the present disclosure. See, e.g., operation 540 and operation 530 in FIG. 5 and relevant descriptions thereof.

In some embodiments, the processing device 112A may determine a target event based on the background image, the second image, the third image, and the fourth image. As used herein, the target event refers to a road pollution event caused by a movable subject. For example, when a construction vehicle (e.g., a muck truck) is running on a road, some pollutants (e.g., muck or mud) may be leaked or sprinkled on the road, which may cause a road pollution event (i.e., the target event). More descriptions for the determining of the target event based on the background image, the second image, the third image, and the fourth image may be found elsewhere in the present disclosure. See, e.g., operation 590 in FIG. 5 and relevant descriptions thereof.

In 760, the processing device 112A (e.g., the fourth determination module 410) may determine that the first subject is not the target subject.

In some embodiments, the processing device 112A may further determine that the target event does not occur.

It will be apparent to those skilled in the art that various changes and modifications can be made in the present disclosure without departing from the spirit and scope of the disclosure. In this manner, the present disclosure may be intended to include such modifications and variations if the modifications and variations of the present disclosure are within the scope of the appended claims and the equivalents thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or combination of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:

at least one storage device including a set of instructions; and at least one processor in communication with the at least one storage device, wherein when executing the set of instructions, the at least one processor is directed to cause the system to perform operations including:

obtaining a first image including a first subject and information related to the first subject;

determining, based on the first image and the information related to the first subject, a second image including the first subject, wherein the second image is captured no later than the first image;

determining, based on the second image, a third image including a second subject, wherein the first subject is associated with the second subject;

determining a background image which does not include the first subject;

determining a target event based on the background image, the second image, and the third image;

determining, based on the second image, a fourth image, wherein the fourth image is captured no less than a time threshold later than the second image, and the time threshold is determined according to at least one of a season and an environment temperature; and determining whether the target event has occurred by determining whether the fourth image includes the first subject based on the information related to the first subject.

2. The system of claim 1, wherein the determining whether the target event has occurred by determining whether the fourth image includes the first subject based on the information related to the first subject including:

in response to determining that the fourth image includes the first subject, determining the target event based on the background image, the second image, the third image, and the fourth image.

3. The system of claim 1, wherein the determining whether the fourth image includes the first subject based on the information related to the first subject including:

obtaining a target region of the fourth image corresponding to the position of the first subject; and determining whether the fourth image includes the first subject in the target region.

4. The system of claim 1, wherein the at least one processor is further directed to cause the system to perform operations including:

in response to determining that the fourth image does not include the first subject, determining that the target event does not occur.

5. The system of claim 1, wherein the determining, based on the first image and the information related to the first subject, a second image including the first subject includes:

obtaining a plurality of first historical images which are captured earlier than the first image;

determining whether one or more first candidate images of the plurality of first historical images include the first subject; and in response to determining that one or more first candidate images includes the first subject, determining a first candidate image as the second image from the one or more first candidate images.

6. The system of claim 5, wherein the determining, based on the first image and the information related to the first subject, a second image including the first subject includes:

in response to determining that no first candidate image includes the first subject, designating the first image as the second image.

7. The system of claim 1, wherein the determining, based on the second image, a third image including a second subject includes:

obtaining a plurality of second historical images which are captured earlier than the second image;

determining, based on the plurality of second historical images, one or more second candidate images each of which includes the second subject; and determining a second candidate image captured at the latest as the third image from the one or more second candidate images.

8. The system of claim 1, wherein the determining a background image includes:

obtaining a plurality of third historical images which are captured earlier than the third image;

determining, based on the plurality of third historical images and the information related to the first subject, one or more third candidate images each of which does not include the first subject; and determining a third candidate image captured at the latest as the background image from the one or more third candidate images.

9. The system of claim 1, wherein the obtaining a first image including a first subject and information related to the first subject includes:

determining the first image including the first subject and the information related to the first subject using a subject detection model, wherein the subject detection model is a machine learning model.

10. The system of claim 1, wherein the obtaining a first image including a first subject and information related to the first subject includes:

obtaining an initial image including the first subject;

determining whether a clarity of the initial image exceeds a threshold;

in response to determining that the clarity of the initial image exceeds the threshold, designating the initial image as the first image.

11. The system of claim 1, wherein the at least one processor is further directed to cause the system to perform operations including:

obtaining, based on the third image, identity information of the second subject; and determining the target event based on the background image, the second image, the third image, and the identity information of the second subject.

12. A system, comprising:

at least one storage device including a set of instructions; and at least one processor in communication with the at least one storage device, wherein when executing the set of instructions, the at least one processor is directed to cause the system to perform operations including:

obtaining a first image including a first subject and information related to the first subject;

determining, based on the first image and the information related to the first subject, a second image including the first subject, wherein the second image is captured no later than the first image;

determining, based on the second image, a third image, wherein the third image is captured no less than a time threshold later than the second image;

determining whether the third image includes the first subject based on the information related to the first subject;

in response to determining that the third image includes the first subject, determining that the first subject is a target subject;

determining a background image which does not include the first subject;

determining, based on the second image, a fourth image including a second subject, wherein the first subject is associated with the second subject, the fourth image is captured no less than a time threshold later than the second image, and the time threshold is determined according to at least one of a season and an environment temperature; and determining a target event based on the background image, the second image, the third image, and the fourth image.

13. The system of claim 12, wherein the determining whether the third image includes the first subject based on the information related to the first subject including:

obtaining a target region of the third image corresponding to the position of the first subject; and determining whether the third image includes the first subject in the target region.

14. The system of claim 12, wherein the at least one processor is further directed to cause the system to perform operations including:

in response to determining that the third image does not include the first subject, determining that the target event does not occur.

15. The system of claim 12, wherein the determining, based on the first image and the information related to the first subject, a second image including the first subject includes:

obtaining a plurality of first historical images which are captured earlier than the first image;

determining whether one or more first candidate images of the plurality of first historical images include the first subject; and in response to determining that one or more first candidate images includes the first subject, determining a first candidate image as the second image from the one or more first candidate images.

16. The system of claim 15, wherein the determining, based on the first image and the information related to the first subject, a second image including the first subject includes:

in response to determining that no first candidate image includes the first subject, designating the first image as the second image.

17. A method, implemented on a computing device having at least one processor and at least one storage device, the method comprising:

obtaining a first image including a first subject and information related to the first subject;

determining, based on the first image and the information related to the first subject, a second image including the first subject, wherein the second image is captured no later than the first image;

determining, based on the second image, a third image including a second subject, wherein the first subject is associated with the second subject;

determining a background image which does not include the first subject;

determining a target event based on the background image, the second image, and the third image;

determining, based on the second image, a fourth image, wherein the fourth image is captured no less than a time threshold later than the second image, and the time threshold is determined according to at least one of a season and an environment temperature; and determining whether the target event has occurred by determining whether the fourth image includes the first subject based on the information related to the first subject.

18. The system of claim 1, wherein the at least one processor is further directed to cause the system to perform operations including:

obtaining a plurality of first historical images which are captured within a time period earlier than the first image;

determining whether each of the plurality of first historical images includes the first subject; and in response to determining that each of the plurality of first historical images includes the first subject, determining that the target event does not occur.

* * * * *